June 2, 1936.  W. FERRIS  2,042,519
LOAD SHIFTING MECHANISM FOR POWER VEHICLES
Original Filed Jan. 30, 1933  3 Sheets—Sheet 3

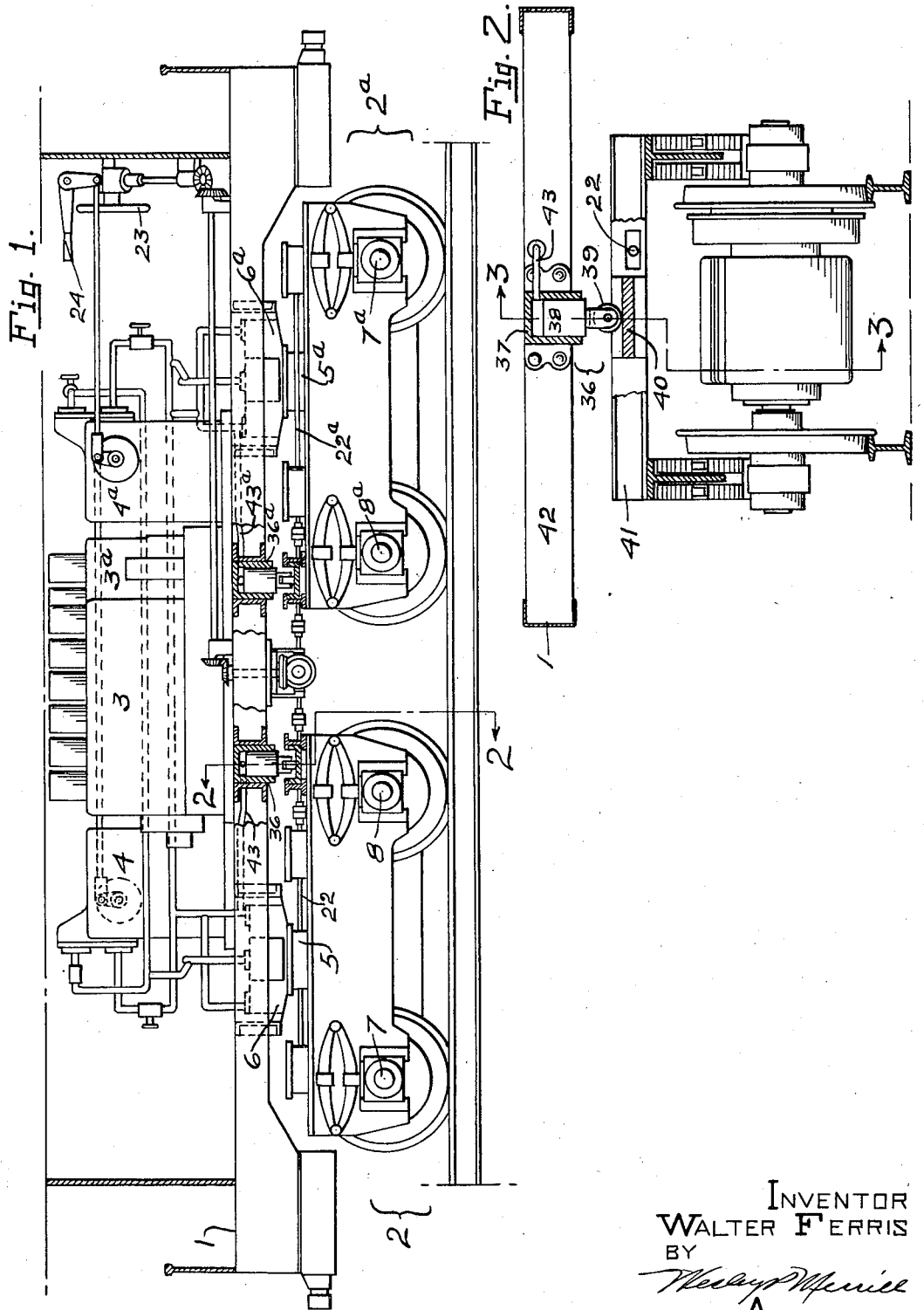

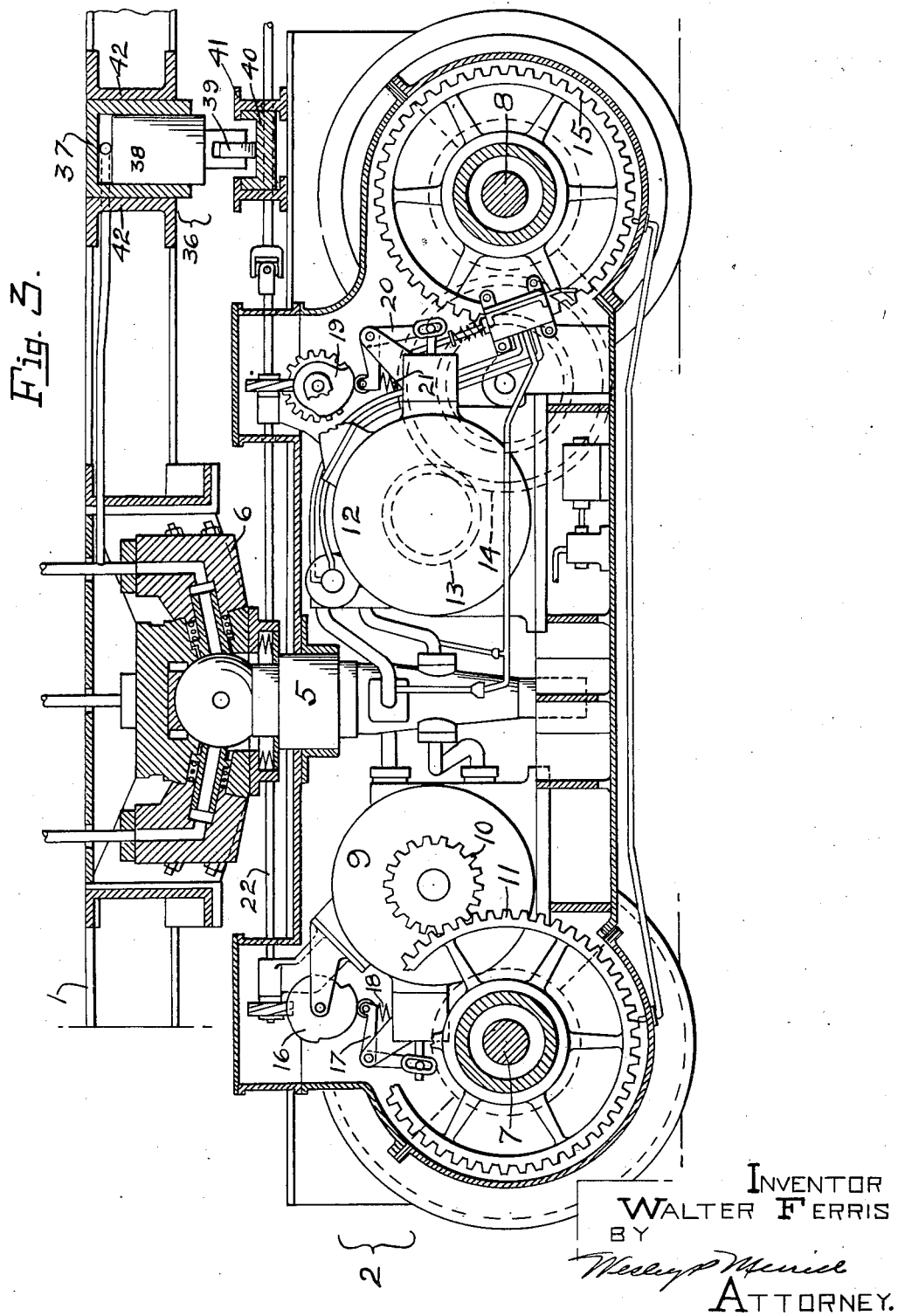

Fig 4

INVENTOR
WALTER FERRIS
BY
*Wesley Merrill*
ATTORNEY.

Patented June 2, 1936

2,042,519

UNITED STATES PATENT OFFICE 2,042,519

LOAD SHIFTING MECHANISM FOR POWER VEHICLES

Walter Ferris, Milwaukee, Wis., assignor to The Oilgear Company, Milwaukee, Wis., a corporation of Wisconsin Original application January 30, 1933, Serial No. 654,157, now Patent No. 2,037,373, dated April 14, 1936. Divided and this application November 9, 1934, Serial No. 752,207

21 Claims. (Cl. 105—75)

This invention relates to power vehicles of the type employed to exert tractive forces upon independently supported loads, such as the power vehicle described and claimed in Patent No. 2,037,373 which issued April 14, 1936 on application Serial No. 654,157, filed January 30, 1933, of which this application is a division.

A power vehicle or locomotive is ordinarily so constructed that its weight is equally distributed upon the several pairs of driving wheels when the vehicle is stationary but, when the vehicle is started under its own power or when it is exerting a tractive force upon an independently supported load, a part of the weight carried by the front wheels of each self-propelled truck is shifted to the rear wheels of that truck due to the fact that the center of gravity of the masses to be accelerated and the draw bar pull are in much higher planes than the tracks upon which tractive force is exerted by the wheels.

This transfer of weight reduces the traction of the front wheels and causes them to slip before the rear wheels slip when a high rotative force is applied to the wheels during the starting period or when the vehicle is attempting to accelerate a heavy load.

It has heretofore been proposed to apply an independent loading force to the front wheels of a power vehicle during the starting period but no provision has been made for applying such a force during continued operation of the vehicle or for varying that force in accordance with variations in the tractive effort of the engine or other propelling means.

The present invention has as an object to provide a power vehicle in which the weight shifting effect of the propelling force is counteracted throughout the entire period during which the vehicle is in operation.

Another object is to provide a power vehicle with means for exerting an independent loading force upon the wheels from which the propelling force tends to shift weight, and for varying the loading force according to variations in the propelling force.

Another object is to provide a power vehicle with a load-transferring mechanism which is operated automatically in response to operation of the engine or motor employed to drive the vehicle.

Another object is to provide a power vehicle with a load-transferring mechanism which is simple in construction, sturdy, and positive in operation.

Other objects and advantages will appear from the description hereinafter given of an illustrative embodiment of the invention.

According to the invention in a general aspect, a load-transferring mechanism is arranged at the front end of a vehicle truck and energized during the entire time the vehicle is in operation.

According to the invention in a more particular aspect, the load-transferring mechanism is energized by the power means which energizes the driving motor.

According to the invention in another aspect, the body of the vehicle is supported upon a truck by a bearing which is arranged nearer to one axle of the truck than to the other axle thereof, and an independent loading force is applied to the axle which is farther from the bearing whenever the vehicle is moving in a direction to make that axle the leading axle.

The invention is exemplified by the apparatus illustrated in the accompanying drawings in which the views are as follows:

Fig. 1 is a side elevation, partly in section, of a hydraulic locomotive to which the invention has been applied.

Fig. 2 is in part an end view of one of the locomotive trucks and in part a transverse section showing a cylinder and piston by means of which an individual loading force may be applied to one of the truck axles, the view being taken approximately along the irregular line 2—2 of Fig. 1.

Fig. 3 is a sectional elevation of one of the trucks taken approximately along the irregular line 3—3 of Fig. 2.

Fig. 4 is a diagram illustrating the hydraulic circuit of the locomotive and showing the relation of the load-transferring means to the motors which drive the locomotive.

The locomotive has not been fully illustrated nor will it be described in detail for the reason that it is fully illustrated and described in the application referred to above.

Briefly, it is provided with a body 1 which is supported upon two trucks 2 and 2ª and carries two internal combustion engines 3 and 3ª and two reversible pumps 4 and 4ª which are driven, respectively, by the engines 3 and 3ª.

The trucks 2 and 2ª are identical but are arranged in reverse position beneath the body 1. That is, one truck is turned end for end in respect to the other truck.

The locomotive is symmetrical about its transverse centerline and, in order that corresponding parts may be readily distinguished, the parts on one side of the centerline have been designated by certain reference numerals and the corresponding parts on the other side of the centerline have been designated by the same reference numerals with the exponent "a" added.

The body 1 is supported on each of the trucks by a center bearing consisting of a post 5, which is rigidly anchored in the frame of the truck and has a spherical upper end, and a socket 6 which is fitted upon the spherical upper end of the post 5 and rigidly secured to the frame 1 upon the under side thereof.

Each truck is supported at one end by two wheels fixed on an axle 7 and at the other end by two wheels fixed on an axle 8. As shown in Fig. 3, the axle 7 is driven by a variable displacement rotary hydraulic motor 9 through single reduction gearing 10—11, and the axle 8 is driven by a variable displacement rotary hydraulic motor 12 through double reduction gearing 13—14—15.

Under certain conditions of operation, the motors 9 and 12 are simultaneously supplied with liquid from the pumps 4 and 4ª so that the torque of the two motors is the same. Consequently, the motor 12 will operate at a higher speed than the motor 9 and will exert a greater rotative force upon the axle 8 than the motor 9 exerts upon the axle 7 due to the fact that the ratio of the gearing 13—14—15 is much greater than the ratio of the gearing 10—11.

The motors 9 and 12 are driven by liquid supplied thereto from the pumps 4 and 4ª. The direction in which the motors are driven depends upon the direction in which liquid is delivered thereto, and the speed at which each motor is driven depends upon its displacement and upon the rate at which the liquid is delivered.

The displacement of the motor 9 is varied by a cam wheel 16 (Fig. 3) acting through a bell crank lever 17 which has one of its arms connected by a pin and slot connection to the stroke-changing element of the motor and its other arm provided with a roller and urged by a spring 18 in a direction to decrease motor displacement, the spring 18 holding the roller against the periphery of the cam wheel 16.

The displacement of the motor 12 is varied by a cam wheel 19 acting through a bell crank lever 20 which has one of its arms connected by a pin and slot connection to the stroke-changing element of the motor and its other arm provided with a roller and urged by a spring 21 in a direction to decrease motor displacement, the spring 21 holding the roller against the periphery of the cam wheel 19.

The cam wheels 16 and 19 may be rotated simultaneously by a control shaft 22 (Fig. 3) which is connected by suitable gearing to the shafts upon which the cam wheels 16 and 19 are fixed. The shaft 22 is connected through suitable shafting and gearing to a hand wheel 23 (Fig. 1) arranged at one end of the body 1, universal joints being arranged in the shafting to provide for the trucks pivoting beneath the body when the locomotive travels around a curve. The motors on the truck 2ª are similarly controlled from the same hand wheel so that all motors may be adjusted simultaneously.

The contours of the cam wheels 16 and 19 are such that, during rotation of the hand wheel 23, the displacement of the motor 12 is gradually reduced faster than the displacement of the motor 9 until it is at a predetermined minimum at which time it is suddenly reduced to zero and short-circuited, and the displacement of the motor 9 is simultaneously increased by a like amount as fully explained in the application referred to above. Thereafter, the displacement of the motor 9 may be gradually reduced until it is at a predetermined minimum.

The delivery of liquid to the motors is controlled by varying the rate and the direction of delivery from the pumps 4 and 4ª each of which has its displacement varying mechanism connected by suitable linkage to a lever 24 arranged at one end of the body 1.

When the lever 24 is in its central or neutral position, the pumps are at zero stroke and no liquid is being delivered thereby. When the lever 24 is moved in one direction or the other from its neutral position, the pumps will deliver liquid in one direction or the other and at a rate depending upon the direction and the distance the lever 24 is moved from its neutral position.

In starting the locomotive from a stationary position, at which time the pumps 4 and 4ª are at zero stroke, the control wheel 23 is operated to adjust the motors to full stroke in order that they may have the highest torque and then the control lever 24 is operated to adjust the pumps and cause them to deliver liquid at a limited volumetric rate to the motors whereby the full power of the engines 3 and 3ª is available for operating the motors at slow speed and enabling them to exert high rotative forces upon the driving wheels and thereby start the locomotive and its load.

After the locomotive has been started, the control lever 24 may be operated to increase pump displacement and thereby increase the speed of the locomotive until the pumps are at full stroke and then the control wheel 23 may be operated to reduce motor displacement and thereby further increase the motor speed with the resultant increase in the speed of the locomotive.

When the lever 24 has been moved to the point where the displacement of the high speed motor 12 has been reduced to the predetermined minimum, the motor is operating at approximately the highest speed for which it is designed to work with its pistons reciprocating and transmitting power. For higher locomotive speeds the high speed motors should be short-circuited and returned to zero stroke, in which condition they are in perfect balance and relieved of load, and can spin freely at higher speeds as the locomotive is driven faster by the other motors. Further movement of the lever 24 causes the high speed motor on each truck to be suddenly adjusted to zero displacement and short-circuited, and the entire output of the pump to be directed to the other two motors. Still further movement of the lever 24 reduces the displacement of these two motors and further increases the speed of the locomotive.

Liquid for operating the motors is delivered by the pumps 4 and 4ª into a pipe 25 or into a pipe 26 (Fig. 4) depending upon the direction in which the lever 24 is moved from its neutral position. The pipes 25 and 26 are connected, respectively, by pipes 27 and 28 to the socket 5 of the center bearing on the truck 2 and by pipes 27ª and 28ª to the socket 5ª of the center bearing on the truck 2ª.

The pipes 27 and 28 are connected to the socket 5 in communication, respectively, with fluid channels 29 and 30 extending through the center bearing 5—6 which, in addition to supporting the body 1 upon the truck 2, functions as a flexible connection for the delivery of liquid to the motor as explained in the application referred to above.

The channels 29 and 30 are connected, respectively, by two pipes 31 and 32 to the two ports of the motor 9 and by two pipes 33 and 34 to a valve 35 through which liquid is delivered to the motor 12 and by means of which the motor 12 is short-circuited.

The center bearing on the truck 2a is provided with channels 29a and 30a which correspond to the channels 29 and 30 in the center bearing on the truck 2. The motors 9a and 12a on the truck 2a are connected to the channels 29a and 30a by connections which correspond to the above described connections and which have been designated by corresponding reference numerals with the exponent "a" added. However, since the truck 2a is turned end for end in respect to the truck 2 and since the motors 9a and 12a must operate in the same direction as the motors 9 and 12 operate, the pipe 27a is connected to the socket 5a in communication with the channels 30a and the pipe 28a is connected to the socket 5a in communication with the channels 29a.

With this arrangement, both of the pumps deliver liquid simultaneously to the motors on both of the trucks so that equal volumes of liquid are delivered at the same pressure to the motors on both trucks.

When the motors are energized to propel the locomotive, the inertia of the body 1 and the tractive force exerted by the locomotive tends to shift weight from the leading axle of each truck to the following axle of that truck in respect to the direction of movement for the reason that the draw bar pull and the center of gravity of the accelerated masses are in much higher planes than the rails which exert the tractive force on the wheels. The amount of weight thus shifted is proportional to the tractive force exerted by the locomotive, and the tractive force is proportional to the working pressure existing in the liquid which drives the motors.

If no provision were made for counteracting this weight-shifting effect, the front wheels of each truck would slip long before the motors had exerted a maximum rotative force upon the rear wheels, thereby materially limiting the tractive effort of the locomotive.

Slippage of the front wheels may be prevented by exerting an independent loading force upon the front axle of each truck in response to a tractive effort of the locomotive or by so supporting the locomotive body upon the truck that the front axle of each truck carries a greater weight than the rear axle when the locomotive is idle so that, when the locomotive is started or is exerting a tractive effort upon an independently supported load, the weight shifted from the front axle to the rear axle will approximately equalize the load upon the two axles at the maximum draw bar pull and enable both the front and the rear wheels to have sufficient traction to start the locomotive or to move an independently supported load.

If unequal loading of the axles were solely depended upon to prevent wheel slippage, it is obvious that all of the wheels would have sufficient traction only when the locomotive was operated in but one direction while, if the application of an independent loading force to the front axles were solely depended upon to prevent wheel slippage, it would be necessary to provide mechanisms for selectively exerting independent loading forces upon all axles in order that the locomotive might operate in either direction and all of its wheels have sufficient traction in either direction of operation.

In order that the number of mechanisms for exerting independent loading forces upon the axles may be kept at a minimum in a locomotive which is operable in either direction, the locomotive body is supported upon each truck at a point nearer to one axle than to the other axle so that the nearer axle of each truck carries a greater load than the far axle when the locomotive is idle, a loading mechanism is provided for exerting an independent loading force upon the far axle of each truck, and only one of those loading mechanisms is energized at a time, the one energized depending upon the direction in which the locomotive moves or tends to move.

As shown, the center bearing 5—6 on the truck 2 is arranged nearer the axle 7 than to the axle 8, a hydraulic jack 36 is secured to the body 1 above the axle 8 to exert an independent loading force thereon whenever the locomotive tends to move in a direction which makes the axle 8 the leading axle, the truck 2a is turned end for end so that the two end axles 7 and 7a carry greater loads than the center axles 8 and 8a when the locomotive is idle, and a hydraulic jack 36a is secured to the body 1 above the axle 8a to exert an independent loading force thereon whenever the locomotive tends to move in a direction which makes the axle 8a the leading axle. Of course, the arrangement could be reversed so that the center bearings would be arranged nearer the center axles 8 and 8a and the jacks 36 and 36a would be arranged above the end axles 7 and 7a.

The jack 36 consists primarily of a cylinder 37 and a piston 38 fitted therein and provided upon its lower end with a roller 39 to engage a bearing plate 40 fixed between two beams 41 which extend across the end of the truck 2 and are supported upon the side frames thereof.

The cylinder 37 is fastened to the body 1 upon the under side thereof as by being secured between two channel bars 42 which extend across the body 1 and are fastened to the side sills thereof. The jack 36a is similarly constructed and arranged.

The jack 36 is connected at the upper end of its cylinder 37 to the pipe 28 by a pipe 43 and the jack 36a is connected at the upper end of its cylinder 37a to the pipe 27a by a pipe 43a, so that jack 36 will be energized whenever driving liquid is delivered to the motors through the pipe 28 and jack 36a will be energized whenever driving liquid is being delivered to the motors through pipe 27a.

When the pumps 4 and 4a deliver liquid to the driving motors through pipes 28 and 28a, the motors will move the locomotive toward the right in respect to Fig. 1 and liquid will be returned to the pumps through pipes 27 and 27a. Therefore, high pressure prevails in pipe 28 so that the jack 36 is enabled to exert a loading force upon the axle 8, and low pressure prevails in pipe 27a so that the jack 36a is inactive.

The tractive effort of the locomotive causes weight to be shifted from the heavily loaded leading axle 7a to the more lightly loaded following axle 8a, so that the axles of the truck 2a are more evenly loaded, and tends to cause weight to be shifted from the axle 8 to the axle 7 of truck 2 but is prevented from doing so by the jack 36 which exerts upon the axle 8 a loading force great enough to overcome the weight shifting effect of the tractive force and to also compensate at least in part for the loading effect caused by placing the center bearing nearer the axle 7 than to the axle 8.

Since the jack 36 is connected to the high pressure side of the pump and since the pressure of the liquid is always proportional to the tractive force, the loading force exerted upon the axle 8 will always be proportional to the tractive force, and always sufficient to prevent slipping of the front wheels at the existing working pressure. When the pressure reaches the maximum, the loads on the near and far axles will be equal, or in any ratio to each other which may be provided for in the design of jacks 36—36ª.

When the pumps 4 and 4ª deliver liquid to the driving motors through pipes 27 and 27ª, the motors will move the locomotive toward the left in respect to Fig. 1 and liquid will be returned to the pump through pipes 28 and 28ª. Therefore, conditions will be exactly reversed from those above described. That is, the jack 36ª will be energized and the jack 36 will be inactive.

The invention herein set forth is susceptible of various modifications without departing from the scope thereof as hereafter claimed.

The invention is hereby claimed as follows:

1. In a power vehicle, the combination of a body, a truck arranged beneath said body to support the same and having a plurality of axles with wheels thereon, the weight carried by said truck being distributed in a definite ratio between said axles, power means for driving one or more of said axles, a draw bar so positioned that tractive force exerted therethrough shifts a part of the load from one axle to another, and means automatically operated by said power means to counteract the load shifting effect of a force exerted through said draw bar.

2. In a power vehicle, the combination of a body, a truck having two axles and carrying a part of the weight of said body and so arranged that the weight carried thereby is distributed unequally between said axles, power means for driving one of said axles, and means operated by said power means for automatically increasing the load upon said power driven axle in response to said power means driving said axle in a given direction.

3. In a power vehicle, the combination of a body, a truck having a plurality of axles and carrying a part of the weight of said body and so arranged that the weight carried thereby is distributed unequally between said axles, power means for driving one of said axles, and means responsive to said power means driving said axle in a given direction for automatically exerting an independent loading force upon said power driven axle and for varying said force according to variations in the force exerted by said power means.

4. In a power vehicle, a body, a truck arranged beneath said body and having two axles with wheels thereon to support the same, a support carried by said truck for supporting at least a part of the weight of said body, said support being arranged nearer to one axle than to the other axle, separate power means for driving each of said axles, and load-transferring means for increasing the load upon the more distant axle in response to said power means moving said vehicle in a direction which makes said more distant axle the leading axle.

5. In a power vehicle, a truck having front and rear wheels, power means for rotating said wheels to drive said vehicle and enable it to exert a tractive force upon an independently supported load whereby said tractive force tends to shift weight from said front wheels to said rear wheels, and means operated by said power means for exerting an independent loading force upon said front wheels in response to said power means tending to move said vehicle forward.

6. In a power vehicle, a truck having front and rear wheels, hydraulic power means for rotating said wheels to drive said vehicle and enable it to exert a tractive force upon an independently supported load whereby said tractive force tends to shift weight from said front wheels to said rear wheels, and hydraulic means operated by said power means for exerting an independent loading force upon said front wheels in response to said power means tending to move said vehicle forward.

7. In a power vehicle, a truck having front and rear wheels, power means for rotating said wheels to drive said vehicle and enable it to exert a tractive force upon an independently supported load whereby said tractive force tends to shift weight from said front wheels to said rear wheels, and means responsive to said power means tending to move said vehicle forward for exerting an independent loading force upon said front wheels and for varying said loading force in accordance with variations in said tractive force.

8. In a power vehicle, a body, a plurality of wheels for supporting said body, power means for rotating said wheels to drive said vehicle in either direction and enable it to exert a tractive force upon an independently supported load whereby said tractive force tends to shift weight from the front wheels to the rear wheels in respect to the direction of movement, and means operated by said power means and responsive to said power means tending to operate said vehicle in either direction for counteracting the weight shifting effect of said tractive force in either direction of operation of said vehicle.

9. In a power vehicle, a body, a plurality of wheels for supporting said body, power means for rotating said wheels to drive said vehicle in either direction and enable it to exert a tractive force upon an independently supported load whereby said tractive force tends to shift weight from the front wheels to the rear wheels in respect to the direction of movement, and means responsive to said power means tending to operate said vehicle in either direction for exerting an independent loading force upon said front wheels in either direction of operation of said vehicle and for maintaining said loading force proportional to said tractive force.

10. In a power vehicle, the combination of a body, a truck arranged beneath said body to support the same and having a plurality of axles with wheels thereon, the weight carried by said truck being distributed in a definite ratio between said axles, a hydraulic motor for driving an axle, a pump for supplying motive fluid to said motor, a draw bar so positioned that tractive force exerted therethrough shifts a part of the load from one axle to another, a hydraulic jack arranged between said body and said truck above the axle from which a part of the load is shifted by said tractive force, and means connecting said jack to said pump in parallel with said motor.

11. In a power vehicle, a body, a truck arranged beneath said body and having two axles with wheels thereon to support the same, a support carried by said truck for supporting at least a part of the weight of said body, said support being arranged nearer to one axle than to the other axle, separate hydraulic motors for driving each of said axles with different tractive forces, the larger tractive force being imparted to the axle more distant from said support, pumping means for supplying motive liquid to said motors, fluid channels connecting said motors to said pumping means and forming therewith a hydraulic circuit, load-transferring means for increasing the load upon the more distant axle, and means connecting said load-transferring means to that side of said circuit which is the high pressure side when said motors are driving said vehicle in a given direction.

12. In a power vehicle, a truck having front and rear wheels, hydraulic driving means for rotating said wheels to drive said vehicle and enable it to exert a tractive force upon an independently supported load whereby said tractive force tends to shift weight from said front wheels to said rear wheels, pumping means for supplying motive liquid to said driving means, fluid channels connecting said driving means to said pumping means and forming therewith a hydraulic circuit, hydraulic load-transferring means for exerting an independent loading force upon said front wheels, and means connecting said load-transferring means to that side of said circuit which is the high pressure side when said driving means is operating in a direction to move said vehicle forward.

13. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axle nearer each bearing carries a greater load than the more distant axle when said vehicle is stationary, power means for rotating said axles in either direction to enable said vehicle to exert a tractive force in either direction upon an independently supported load, said tractive force tending to shift a part of the load carried by the leading axle to the following axle in respect to the direction in which said vehicle tends to move an independently supported load, and load-transferring means for increasing the load on the more distant axle of either truck whenever that axle is the leading axle.

14. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axle nearer each bearing carries a greater load than the more distant axle when said vehicle is stationary, power means for applying different rotative forces to the axles of each truck to rotate said axles in either direction and thereby enable said vehicle to exert a tractive force in either direction upon an independently supported load, said tractive force tending to shift a part of the load carried by the leading axle to the following axle in respect to the direction in which said vehicle tends to move an independently supported load, and load-transferring means for increasing the load on the more distant axle of either truck whenever that axle is the leading axle.

15. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axles nearer each bearing carries a greater load than the more distant axle when said vehicle is stationary, power means for rotating said axles in either direction to enable said vehicle to exert a tractive force in either direction upon an independently supported load, said tractive force tending to shift a part of the load carried by the leading axle to the following axle in respect to the direction in which said vehicle tends to move an independently supported load, and load-transferring means operated by said power means for increasing the load on the more distant axle of either truck whenever that axle is the leading axle.

16. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axles nearer each bearing carries a greater load than the more distant axle when said vehicle is stationary, hydraulic power means for rotating said axles in either direction to enable said vehicle to exert a tractive force in either direction upon an independently supported load, said tractive force tending to shift a part of the load carried by the leading axle to the following axle in respect to the direction in which said vehicle tends to move an independently supported load, and hydraulic load-transferring means for increasing the load on the more distant axle of either truck whenever that axle is the leading axle.

17. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axle nearer each bearing carries a greater load than the more distant axle when said vehicle is stationary, hydraulic power means for applying different rotative forces to the axles of each truck to rotate said axles in either direction and thereby enable said vehicle to exert a tractive force in either direction upon an independently supported load, said tractive force tending to shift a part of the load carried by the leading axle to the following axle in respect to the direction in which said vehicle tends to move an independently supported load, and hydraulic load-transferring means for increasing the load on the more distant axle of either truck whenever that axle is the leading axle.

18. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axle nearer each bearing carries a greater load than the more distant axle when said vehicle is stationary, hydraulic power means for rotating said axles in either direction to enable said vehicle to exert a tractive force in either direction upon an independently supported load, said tractive force tending to shift a part of the load carried by the leading axle to the following axle in respect to the direction in which said vehicle tends to move an independently supported load, a hydraulic jack arranged between said body and each truck above the axle more distant from the bearing on that truck for increasing the load upon said more distant axle, and means for supplying pressure fluid to one jack or the other in response to said power means driving said axles in one direction or the other.

19. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axle nearer each bearing carries a greater load than the more distant axle when said vehicle is stationary, hydraulic power means for rotating said axles in either direction to enable said vehicle to exert a tractive force in either direction upon an independently supported load, said tractive force tending to shift a part of the load carried by the leading axle to the following axle in respect to the direction in which said vehicle tends to move an independently supported load, a hydraulic jack arranged between said body and each truck above the axle more distant from the bearing on that truck for increasing the load upon said more distant axle, means for supplying pressure fluid to one jack or the other in response to said power means driving said axles in one direction or the other, and means for permitting each truck to pivot freely beneath said body during the time said jack is increasing the load upon said more distant axle.

20. In a power vehicle for moving independently supported loads, the combination of a body, a truck arranged beneath each end of said body to support the same and provided with two axles, a bearing carried by each truck for supporting said body thereon, one bearing being arranged at one side of a point midway between the axles of one truck and the other bearing being arranged at the other side of a point midway between the axles of the other truck whereby the axle nearer each bearing carries a greater load than the more distant axle when said vehicle is stationary, hydraulic motors for rotating said axles in either direction to enable said vehicle to exert a tractive force in either direction upon an independently supported load, said tractive force tending to shift a part of the load carried by the leading axle to the following axle in respect to the direction in which said vehicle tends to move an independently supported load, pumping means, fluid channels connecting said motors to said pumping means and forming therewith a hydraulic circuit, means for reversing the flow of liquid in said circuit, and a hydraulic jack connected to said hydraulic circuit and arranged between said body and each truck above the axle more distant from the bearing on that truck for increasing the load on said more distant axle, one of said jacks being connected to one side of said circuit and the other jack being connected to the other side of said circuit whereby one of said jacks is automatically energized upon said vehicle being driven in either direction.

21. In a power vehicle, a body, a truck arranged beneath said body and having two axles with wheels thereon to support the same, a support carried by said truck for supporting at least a part of the weight of said body, said support being arranged nearer to one axle than to the other axle, separate power means for driving each of said axles with different rotative forces, the larger rotative force being imparted to the axle more distant from said support, and load-transferring means for increasing the load upon the more distant axle in response to said power means moving said vehicle in a direction which makes said more distant axle the leading axle.

WALTER FERRIS.